(No Model.)
H. R. COLLINS.
TIRE.
No. 597,194. Patented Jan. 11, 1898.
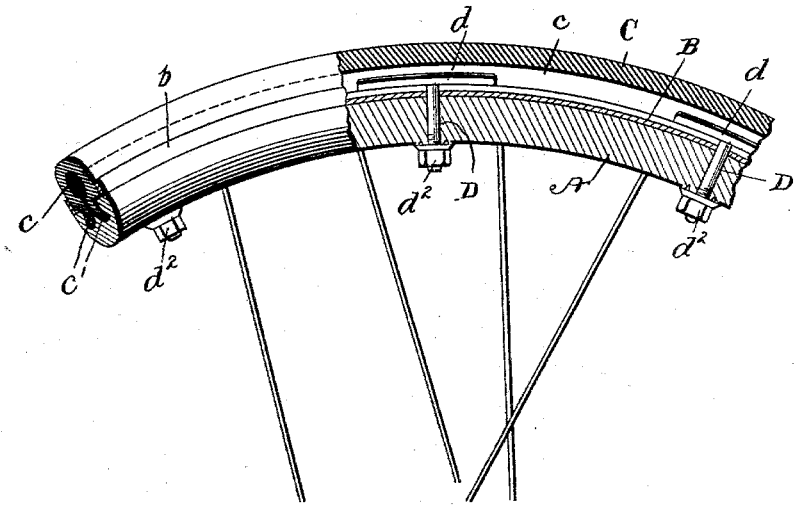
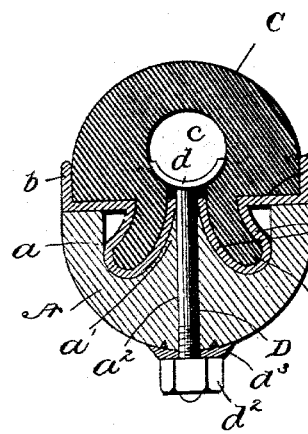
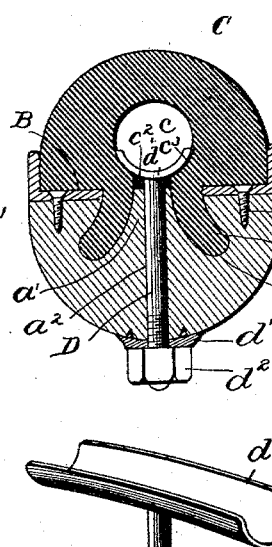
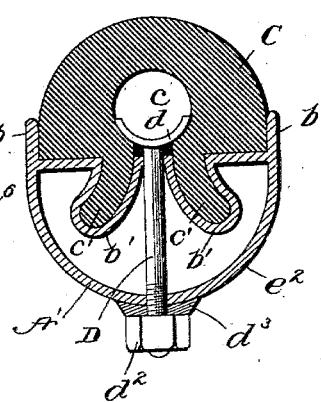
WITNESSES
Edw. Q. Duvall Jr.
Chas. E. Riordon
INVENTOR
Harry R. Collins
By Julian C. Dowell
His Attorney

UNITED STATES PATENT OFFICE.

HARRY R. COLLINS, OF SOUTH BETHLEHEM, PENNSYLVANIA.

TIRE.

SPECIFICATION forming part of Letters Patent No. 597,194, dated January 11, 1898.

Application filed July 15, 1897. Serial No. 644,686. (No model.)

*To all whom it may concern:*

Be it known that I, HARRY R. COLLINS, a citizen of the United States, residing at South Bethlehem, in the county of Northampton and State of Pennsylvania, have invented certain new and useful Improvements in Tires; and I do hereby declare the following to be a full, clear, and exact description of the invention, such as will enable others skilled in the art to which it appertains to make and use the same.

This invention is an improvement in wheels, and especially in the construction of the tires and fellies thereof and the means of uniting the same.

The invention relates more particularly to that class of wheels whose tires have a central bore and annular locking ribs or projections which fit in annular grooves provided for them in the felly for retaining the tire thereon; and the object of this invention is to provide a simple, novel, and efficient means for firmly securing or retaining the tire to the fellies to prevent the tire being wrenched off or otherwise removed therefrom.

The invention will be hereinafter first more particularly described with reference to the accompanying drawings and then pointed out in the claims at the end of the description.

In the drawings, which form a part of this specification, Figure 1 is a perspective view of a portion of a vehicle-wheel, partly in section, showing one form of felly and the means for securing the tire thereto. Fig. 2 is an enlarged cross-section of Fig. 1, showing in elevation the bolt for securing the tire to the felly. Fig. 3 is a view similar to Fig. 2, showing a slight modification of the flanged bed-plate for the tire. Fig. 4 is a cross-section of a modified construction of the felly and tire, and Fig. 5 is a perspective view of the bolt or retaining device employed for securing the tire on the felly.

In the forms shown in Figs. 1, 2, and 3 of the drawings I illustrate a wooden felly A, while in Fig. 4 I illustrate a metal felly A'. The wooden felly A may be of any preferred construction, and, as shown, it is substantially semicircular in cross-section and has a flat periphery, and has two circumferential divergent grooves or recesses $a$, separated by a wedge or V-shaped rib $a'$, through which radial bores $a^2$ are provided for the passage of the tire-fastening devices.

Fitted on the periphery of the felly is a flanged metal bed-plate B, which extends completely around the felly and is formed with vertical side flanges $b$, which embrace the side edges of the tire and prevent spreading thereof. The plate B, as shown in Figs. 1 and 2, may also be provided with circumferential hollow tongues or gutters $b'$, which enter and fit in the grooves $a$ of the felly, so as to line said grooves with metal and stiffen the felly by relieving the wood of much of the spreading strain of the tire. This plate is secured to the felly by the bolts or securing devices for the tire, or by independent means also, if desired.

The tire C is preferably one of that class of tires known as "cushion" tires and substantially in form and construction like the tire disclosed in my application filed June 23, 1897, Serial No. 641,958. It is semicircular in cross-section and formed with a central bore $c$, split $c^2$, and with the inner circumferential outwardly-diverging flanges or ribs $c'$, which fit in the circumferential grooves $a$ or the hollow gutters $b'$ of the bed-plate.

The tire is secured to the felly over the bed-plate by means of bolts or retaining devices D, (see Fig. 5,) which are arranged around the felly at suitable intervals between the spokes of the wheel.

Each retaining device comprises a shank $d'$ and a head $d$, which is preferably substantially semicylindrical in cross-section and slightly curved longitudinally to conform to the contour of the bore $c$ of the tire. The heads of the fastenings, as seen from the cross-sectional views, are placed in the bore of the tire, while the shanks project through the radial openings in the bed-plate and felly, as shown, and are fastened by nuts $d^2$ on their inner threaded ends. Washers $d^3$ may be interposed between the nuts $d^2$ and felly.

It will be observed that the heads of the fastening devices bear directly against the inner portions of the tire above ribs $c'$ and force them tightly into the grooves or gutters in the bed-plate or felly, thus firmly securing the tire in position on the felly. The ribs $c'$ and fastenings D effectually prevent the tire slipping or pulling off the felly, and the flanges $b$ of the bed-plate measurably prevent the tire spreading laterally on the felly, increasing the resiliency of the tire and materially aiding in excluding dirt and grit from between the tire and felly or bed-plate.

As shown in Fig. 3, the construction of the face or bed-plate is simplified, as the gutters $b'$ are omitted, the ribs or flanges on the tire engaging the grooves $a$ of the felly, which in this case conform to the inner contour of the gutters $b'$ of Fig. 2. The bed-plates may be held in position on the felly by screws $a^6$, as shown in Fig. 3.

As shown in Fig. 4, the felly is preferably made entirely of metal, which is rolled to form the bed-plate B, with the vertical flanges $b$ and gutters $b'$, the felly in this instance being formed by a curved metal plate $A'$, this part being welded or otherwise suitably secured to the sides of plate B, so as to make practically a solid felly and plate having the same contour in cross-section as the fellies and plates shown in Figs. 1 and 2. The described form and arrangement of tire-retaining device is used in connection with this felly, as shown.

Having thus fully described my invention, what I claim as new, and desire to secure by Letters Patent of the United States, is—

1. The combination of a wheel-felly having divergent channels in its periphery, a longitudinally-divided cushion-tire substantially semicircular in cross-section and having a substantially circular bore, said tire having ribs engaging the felly-channels respectively, and a fastening device comprising a centrally-located shank passing through the felly, a wedging-head in the division of the tire, and tightening means, whereby the ribs are forcibly pressed into the felly-channels by the action of the wedging-head.

2. The combination of a wheel-felly having divergent channels in its periphery and outstanding side flanges, a longitudinally-divided cushion-tire substantially semicircular in cross-section and having a substantially circular bore, said tire fitting against the felly between the side flanges thereof and having ribs engaging the felly-channels respectively, and a fastening device comprising a centrally-located shank passing through the felly, a wedging-head in the division of the tire, and tightening means, whereby the ribs are forcibly pressed into the felly-channels by the action of the wedging-head and the tire is spread or forced outwardly against the side flanges.

3. In a vehicle-wheel, a felly comprising a circumferentially-recessed underlying portion exteriorly convex in cross-section and an overlying portion or bed-plate formed with a flat periphery or seat for the tire and having integral side flanges projecting outwardly therefrom, substantially at right angles thereto, and intermediate divergent integral depending portions or ribs fitting said recessed portion and having interior circumferential divergent grooves or channels therein adapted to receive corresponding ribs for securing an overlying tire, substantially as described.

4. The combination of a circumferentially-grooved felly, a metallic bed-plate fitting against the periphery thereof and having divergent channels, and a cushion-tire having ribs engaging said channels; together with means for securing the felly, the bed-plate and the cushion-tire together, substantially as described.

5. As a new article of manufacture, a wheel-felly formed entirely of metal and comprising a flat periphery or seat for a tire having integral side flanges projecting outwardly therefrom, substantially at right angles thereto, and intermediate integral divergent portions or ribs depending from said seat portion having circumferential divergent grooves or channels, together with an underlying portion which is concavo-convex in cross-section, into the concavity of which said divergent ribs depend, substantially as described.

In testimony whereof I affix my signature in presence of two witnesses.

HARRY R. COLLINS.

Witnesses:
CHARLES E. RIORDON,
S. B. ARMAT.